US009639457B1

(12) United States Patent
Piszczek et al.

(10) Patent No.: US 9,639,457 B1
(45) Date of Patent: May 2, 2017

(54) DATA STORAGE SYSTEM AND METHOD FOR DATA MIGRATION BETWEEN HIGH-PERFORMANCE COMPUTING ARCHITECTURES AND DATA STORAGE DEVICES USING STORAGE CONTROLLER WITH DISTRIBUTED XOR CAPABILITY

(71) Applicant: DATADIRECT NETWORKS, INC., Chatsworth, CA (US)

(72) Inventors: Michael J. Piszczek, Laurel, MD (US); Jason M. Cope, Columbia, MD (US); William J. Harker, Columbia, MD (US); Thomas E. Fugini, Mt. Airy, MD (US); Pavan Kumar Uppu, Laurel, MD (US)

(73) Assignee: DataDirect Networks, Inc., Chatsworth, CA (US)

( * ) Notice: Subject to any disclaimer, the term of this patent is extended or adjusted under 35 U.S.C. 154(b) by 334 days.

(21) Appl. No.: 13/722,171

(22) Filed: Dec. 20, 2012

(51) Int. Cl.
*G06F 12/00* (2006.01)
*G06F 12/02* (2006.01)

(52) U.S. Cl.
CPC .......... *G06F 12/02* (2013.01); *G06F 12/0246* (2013.01)

(58) Field of Classification Search
CPC .......................... G06F 3/0689; G06F 12/0246
USPC ................................................. 711/103, 114
See application file for complete search history.

(56) References Cited

U.S. PATENT DOCUMENTS

| | | | | |
|---|---|---|---|---|
| 6,151,641 | A * | 11/2000 | Herbert | 710/22 |
| 6,327,671 | B1 * | 12/2001 | Menon | 714/6.12 |
| 6,526,477 | B1 * | 2/2003 | Yuan et al. | 711/114 |
| 6,658,478 | B1 * | 12/2003 | Singhal et al. | 709/232 |
| 7,127,668 | B2 | 10/2006 | McBryde et al. | |
| 8,560,772 | B1 | 10/2013 | Piszczek et al. | |
| 8,601,346 | B1 * | 12/2013 | Onufryk et al. | 714/764 |
| 8,719,520 | B1 | 5/2014 | Piszczek et al. | |
| 2001/0049774 | A1 * | 12/2001 | Otterness | G06F 3/0613 711/148 |
| 2003/0120865 | A1 * | 6/2003 | McDonald et al. | 711/114 |
| 2003/0212860 | A1 * | 11/2003 | Jiang | G06F 3/0689 711/114 |
| 2007/0150791 | A1 * | 6/2007 | Gross et al. | 714/763 |
| 2008/0140932 | A1 * | 6/2008 | Flynn et al. | 711/114 |
| 2013/0219119 | A1 * | 8/2013 | Galbraith et al. | 711/114 |
| 2014/0189212 | A1 * | 7/2014 | Slaight et al. | 711/103 |

* cited by examiner

*Primary Examiner* — Ryan Bertram
*Assistant Examiner* — Trang Ta
(74) *Attorney, Agent, or Firm* — Rosenberg, Klein & Lee

(57) ABSTRACT

In the data storage system the storage area network performs XOR operations on incoming data for parity generation without buffering data through a centralized RAID engine or processor. The hardware for calculating the XOR data is distributed to incrementally calculate data parity in parallel across each data channel and may be implemented as a set of FPGAs with low bandwidths to efficiently scale as the amount of storage memory increases. A host adaptively appoints data storage controllers in the storage area network to perform XOR parity operations on data passing therethrough. The system provides data migration and parity generation in a simple and effective matter and attains a reduction in cost and power consumption.

18 Claims, 8 Drawing Sheets

(Continued to Fig.6D)

DATA STORAGE SYSTEM AND METHOD FOR DATA MIGRATION BETWEEN HIGH-PERFORMANCE COMPUTING ARCHITECTURES AND DATA STORAGE DEVICES USING STORAGE CONTROLLER WITH DISTRIBUTED XOR CAPABILITY

FIELD OF THE INVENTION

The present invention is directed to data storage systems, and in particular, to a system using RAID (Redundant Array of Independent Disks) principles for data migration between high performance computing cluster architectures (data generated entities) and data storage devices.

More in particular, the present invention is directed to a data storage system in which the storage area network is adapted for calculation of the parity for the data migrating therethrough.

In overall concept, the present invention is directed to a data storage system in which "write" and "read" operations are routed directly to the data storage devices, and where the XOR (exclusive OR) operation is performed by a dedicated data storage controller with embedded XOR capability.

The present invention is also directed to a simplified and inexpensive data storage system that eliminates the use of a centralized RAID engine or central processor, in which the XOR capability of an RAID engine is merged into a storage controller for efficient XOR parity data generation.

Further, the present invention is directed to a data storage system in which the hardware for calculating the XOR data is distributed across the storage area network so that it can efficiently scale as the amount of storage memory increases. The distributed nature of the subject scheme eliminates the need for costly hardware for a centralized RAID engine or CPU to generate the XOR data.

Further, the present invention is directed to a data storage system compatible with miniaturized and power-saving FPGA (Field-Programmable Gate Array) technology with low bandwidths (which can replace a large CPU with large bandwidths), and which, being used in conjunction with a broadcast capability of PCIe switches, permits the performance of RAID operations in a highly efficient manner, i.e. by calculating the XOR without buffing data through a centralized RAID engine or processor.

The present invention is further directed to a data storage system that embeds a flash controller in a storage area network that performs XOR parity operations on data as it passes through the storage area network and is persisted on non-volatile storage devices. The structure uses a simple FPGA to calculate the parity of the data, and a PCIe switch to mirror (or multicast) the data to multiple volatile and non-volatile storage devices to perform data parity calculations in parallel across multiple host data channels in an independent manner.

In addition, the present invention is directed to a data storage system provided with a mechanism for parallel generation of multiple data protection schemes, including XOR-based parity schemes and N-way data replication.

Further, the present invention is directed to a data storage system and method that minimize the number of host-initiated I/O operations and reduces the number of memory copies by taking advantage of PCIe multicast and mirroring capabilities.

BACKGROUND OF THE INVENTION

Computer systems generally employ data storage devices, such as disk drive devices, or solid-state storage devices, for storage and retrieval of large amounts of data. Usually the data storage devices are arranged in an array. The most common type of a storage device array is the RAID (Redundant Array of Inexpensive (Independent) Drives). Arrays of solid-state storage devices, such as flash memory, phase change memory, memristors, and other non-volatile storage units, can also be used in data storage systems operating in accordance with RAID principles.

The RAID-based data storage systems may use a combination of mirroring and/or striping for providing greater protection from lost (or corrupted) data. For example, in some modifications of the RAID system, data is interleaved in stripe units distributed with parity information across all of the storage devices. The parity scheme in the RAID utilizes either a two-dimensional XOR algorithm or a Reed-Solomon Code in a P+Q redundancy scheme.

The main concept of the RAID is the ability to virtualize multiple drives (or other types of storage devices) in a single storage device representation. A number of RAID schemes have evolved, each designed on the principles of aggregated storage space and data redundancy. There are five standard RAID levels originally conceived, but many more operations have evolved. Most commonly used RAID levels include:

RAID 0 which provides a block-level striping without parity or mirroring, which has no redundancy.

In RAID 1, which uses mirroring without parity or striping, data is written identically to two storage devices, thereby producing a mirrored set. "Read" request is serviced by either of the two storage devices containing the requested data, and a "write" request of data is written to both storage devices.

In RAID 10, which uses mirroring and striping, data is written in stripe across the primary storage device and then mirrored to the secondary storage devices.

In RAID 2 level, which is based on bit level striping with dedicated Hamming-code parity, data is striped such that each sequential bit is on a different storage device.

In RAID 3 level, which is based on byte-level striping with dedicated parity, data is striped so each sequential byte is on a different storage device. Parity is calculated across corresponding bytes and stored on a dedicated parity storage device.

RAID 4, employs block-level data striping with dedicated parity, RAID 4 data distribution across drives is similar to RAID 3, but the granularity of the distributed data in RAID 4 (block-level) is coarser than that employed by RAID 3 (byte-level). In this setup, files may be distributed between multiple drives. Each drive operates independently, allowing I/O request to be performed in parallel.

RAID 5 uses block-level striping with distributed parity and distributes parity along with the data and requires all storage devices, but one, to be present to operate. The array in this arrangement is not destroyed by a single storage device failure. Upon storage device failure, any subsequent reads can be calculated from the distributed parity such that the storage device failure is masked from the end user.

RAID 6 uses block-level striping with double distributed parity, and tolerates up to two concurrent device failures.

Most of the RAID schemes employ an error protection scheme called "parity" which is a widely used method in information technology to provide for tolerance in a given set of data. An example RAID-5 storage device is illustrated in FIG. 1. In this example device, user data is aggregated into four stripes consisting of several blocks (blocks $A_1$, $B_1$, $C_1$, $D_1$, $A_2$, . . . ). Each stripe also includes dedicated parity blocks (blocks $A_p$, $B_p$, $C_p$, and $D_p$) generated from the user data and a parity generation algorithm (such as an XOR scheme). Stripes are spread across all hard drives so that each drive absorbs one block from each stripe (either a parity block or data block). In this example, the parity block placement is shifted between stripes so that the parity data is distributed among all the drives. Each stripe block per drive can vary in size, for example, from 4 KB to 256 KB per stripe. The data block size can be modified during device setup or configuration to adjust performance.

Parity data allows RAID storages device to reconstruct lost or corrupted data. In the example illustrated in FIG. 1, the RAID can recover from a failure of Disk 1 by using the accessible user and parity data on Disk 0, Disk 2, and Disk 3 to reconstruct the lost data on Disk 1. For example, the RAID device uses data in blocks $A_1$, $A_3$, and $A_p$ to reconstruct lost block $A_2$.

Parity blocks are usually computed using the Exclusive OR (XOR) on binary blocks of data. An XOR comparison takes two binary bits, represented as "0" and "1", compares them, and outputs an XOR result of "zero" or "one". The XOR engine returns a "1" only if the two inputs are different. If both bits are the same, i.e., both "0"s or both "1"s, the output of the XOR engine would be "0".

For example, as shown in Table 1:
for stripe 1, the XOR parity block may be placed in storage device 4,
for stripe 2, the XOR parity block may be placed in storage device 3,
for stripe 3, the XOR parity block may be placed in storage device 2, and
for stripe 4, the XOR parity block may be placed in storage device 1.

TABLE 1

|  | Storage Device 1 | Storage Device 2 | Storage Device 3 | Storage Device 4 |
|---|---|---|---|---|
| Stripe 1 | 0100 | 0101 | 0010 | 0011 |
| Stripe 2 | 0010 | 0000 | 0110 | 0100 |
| Stripe 3 | 0011 | 0001 | 1010 | 1000 |
| Stripe 4 | 0110 | 0001 | 1101 | 1010 |

The parity blocks are computed by running the XOR comparison on each block of data in the stripe. If the first two blocks are XOR-ed, then the result is XOR-ed against the third block, and the XOR comparison continues for all storage devices in the array, except for the block where the parity is stored.

Traditionally, data persisted in burst buffers or tiers of non-volatile memories that are prone to failures, are protected by using a Central Controller and parity calculating RAID engine. This configuration requires copying data to the CPU, calculating parity by the CPU and then distributing the parity to the data channels. Typically, data to be striped across a set of storage devices is first written into the memory buffer of the CPU. The CPU then reads the data back in chunks (blocks) and calculates the XOR of the data to generate parity. The parity XOR data is then written back to the memory, and subsequently is transferred to the storage devices. This method requires all of the data to be buffered in the memory of the CPU which may create a CPU bottleneck problem.

Referring to FIG. 2 representing a typical RAID engine using a CPU, a host 10 sends a "write" data request to storage devices 12. The data is first written to a memory 14 attached to the CPU 16. In this arrangement, the data is sent to a PCIe switch 18 which forwards it to the CPU 16 which, in turn, passes the data into the memory 14. A memory controller 20 within the CPU 16 controls data writing to, and reading from, the memory 14.

The CPU 16 reads the data from the memory 14, performs an XOR of the data and writes the computed parity data into the memory 14. The CPU 16 then instructs the storage devices 12 to read the data and parity from the memory 14, and saves the data internally.

In this arrangement, all of the data is buffered in the memory 14, thus requiring an overly fast transfer rate of the data in the memory interface. This scheme requires the memory interface to the CPU to be greater than 3× faster than the transfer array of data.

In addition, the reliance of the XOR operation in this arrangement on an expensive CPU and/or GPU, as well as the need for an additional software to be written for the CPU and GPU operation, results in a complex and expensive scheme, which also has a large footprint and elevated needs for cooling and power consumption.

It is therefore desirable to provide XOR parity data generation in an efficient, inexpensive, and simple manner.

SUMMARY OF THE INVENTION

It is therefore an object of the present invention to provide a data storage system operating in compliance with RAID principles, in which XOR parity data is generated in an efficient and inexpensive way.

It is another object of the present invention to provide a data storage system employing a storage area network with embedded XOR capability for parity data calculations applied to data passing therethrough.

It is a further object of the present invention to embed a storage controller in a storage area network that has the ability to perform XOR parity operations on data passing through the storage area network without buffering data through a centralized RAID engine or processor. This allows for "read" and "write" operations to be routed directly to and from the data storage devices.

It is another object of the present invention to integrate the storage controller with FPGA (Field-Programmable Gate Array) technology that may result in attaining lower power consumption and cooling as well as a small footprint.

It is a further object of the present invention to provide a data storage system and method employing the storage network area with distributed XOR calculations thus permitting an efficient scaling as the number of data storage memories increases.

It is a still further object of the present invention to combine the use of FPGA (for parity calculations) with multicast capabilities of PCIe switches (to multiple volatile and non-volatile storage devices) to provide a mechanism for parallel generation of multiple data protection schemes.

In one aspect, the present invention represents a method for generating parity data in a data storage system through the steps of:

coupling a plurality of storage controllers into a storage area network, and embedding an XOR (Exclusive OR) logic function unit to each of the storage controllers.

Upon receipt of a "write" data request from at least one host the method further continues with the steps of:

appointing, in the plurality of storage controllers in the storage area network, a parity storage controller and N data storage controllers in accordance with the size of the "write" data request, i.e., the number and size of data blocks in the incoming data stripe;

writing sequentially each of N data blocks of the "write" data stripe into the parity storage controller as well as into a corresponding data storage array through the data storage device coupled to it;

applying, under control of said parity storage controller, the XOR logic function to the sequentially written data blocks until all data blocks in the incoming data stripe have been processed, and a parity data for the data stripe in question is generated in the parity storage controller.

Subsequently, the parity data is written into a data storage device coupled to the parity storage controller.

The method further permits adapting the distribution of the parity and data storage controllers in accordance with a type and size of different "write" data requests received from the data generating entities over different data channels in a parallel manner.

Preferably, the subject method further is carried out by integrating each of the storage controllers with FPGA (Field-Programmable Gate Array) technology and performing the XOR calculations in the FPGA unit.

In the subject method, a PCIe switch is coupled between at least one host and the plurality of storage controllers, and upon receipt of the "write" data request, the PCIe switch transmits the "write" data to the corresponding data storage devices and mirrors the same to the parity storage controller. Preferably, when a plurality of the subject "write" data requests are sent to the PCIe switch over a plurality of data channels, the subject method permits calculation of the parity data in parallel across the plurality of data channels in an independent manner without involvement of a centralized processor or RAID engine.

The parity storage controller may be also configured as a redundant data controller to perform buffering of the additional copies of each of data blocks in the redundant data controller for replicating the buffered data blocks if needed.

If a "read" request is received from at least one host, the method permits the transfer of the data requested from a corresponding data storage device into the parity storage controller, and subsequently to the host initiating the "read" request. Upon detecting a corrupted (or missing) data block in the read data, the method continues with reconstruction of the corrupted data block by reversing the "write" operation and by using the resulting parity data calculated during the "write" operation as the recovered data.

In another aspect, the present invention represents a data storage system in which the storage area network includes a plurality of storage controllers adaptively coupled each to the other, wherein each of the storage controllers includes:

an XOR logic function unit, a buffer coupled to the XOR logic function unit, and a flash controller coupled to the buffer, and wherein each of the storage controllers is operatively coupled (by an input thereof) to at least one host.

A plurality of data storage devices are coupled to the storage controllers.

Preferably, distribution software is provided in association with the hosts. The distribution software permits the hosts to adaptively configure the storage area network in accordance with the type and the size of the "write" data request, i.e., to adaptively appoint one of the plurality of storage controllers to perform a function of a parity storage controller, and N of the plurality of storage controllers to perform the function of data storage controllers.

The parity storage controller is configured to apply the XOR logic function to a plurality of data blocks of the "write" data request, thereby generating parity data for the "write" data stripe, and to write the resulting parity data to a respective data storage device coupled thereto.

Each data storage controller is configured to transfer each of the data blocks in the "write" data stripe to a respective one of the data storage devices coupled thereto.

Preferably, each of the data storage controllers and the parity storage controller are integrated with a FPGA (Field-Programmable Gate Array). In the parity storage controller, the FPGA performs the XOR logic function.

Preferably, the FPGA unit is configured in the first PCIe compatible port for sequential receipt of the data blocks. An FIFO (first-in-first-out) unit couples the first PCIe compatible port and the buffer for receiving and releasing "write" data blocks as well as the results of XOR calculations. The FPGA is also provided with a second PCIe compatible port coupled between the FIFO unit and the flash controller to "fetch" the parity data out to the respective data storage device upon completion of the entire "write" data stripe XOR-ing.

The subject system uses a PCIe switch coupled between the host(s) and the storage area network. The PCIe switch is configured to mirror and multicast the "write" data blocks to the parity storage controller and to respective data storage devices.

These and other objects and advantages of the present invention will be readily available upon reading the following detailed description of the preferred embodiment in conjunction with the drawing figures.

DETAILED DESCRIPTION OF THE PREFERRED EMBODIMENT

Figure 1:
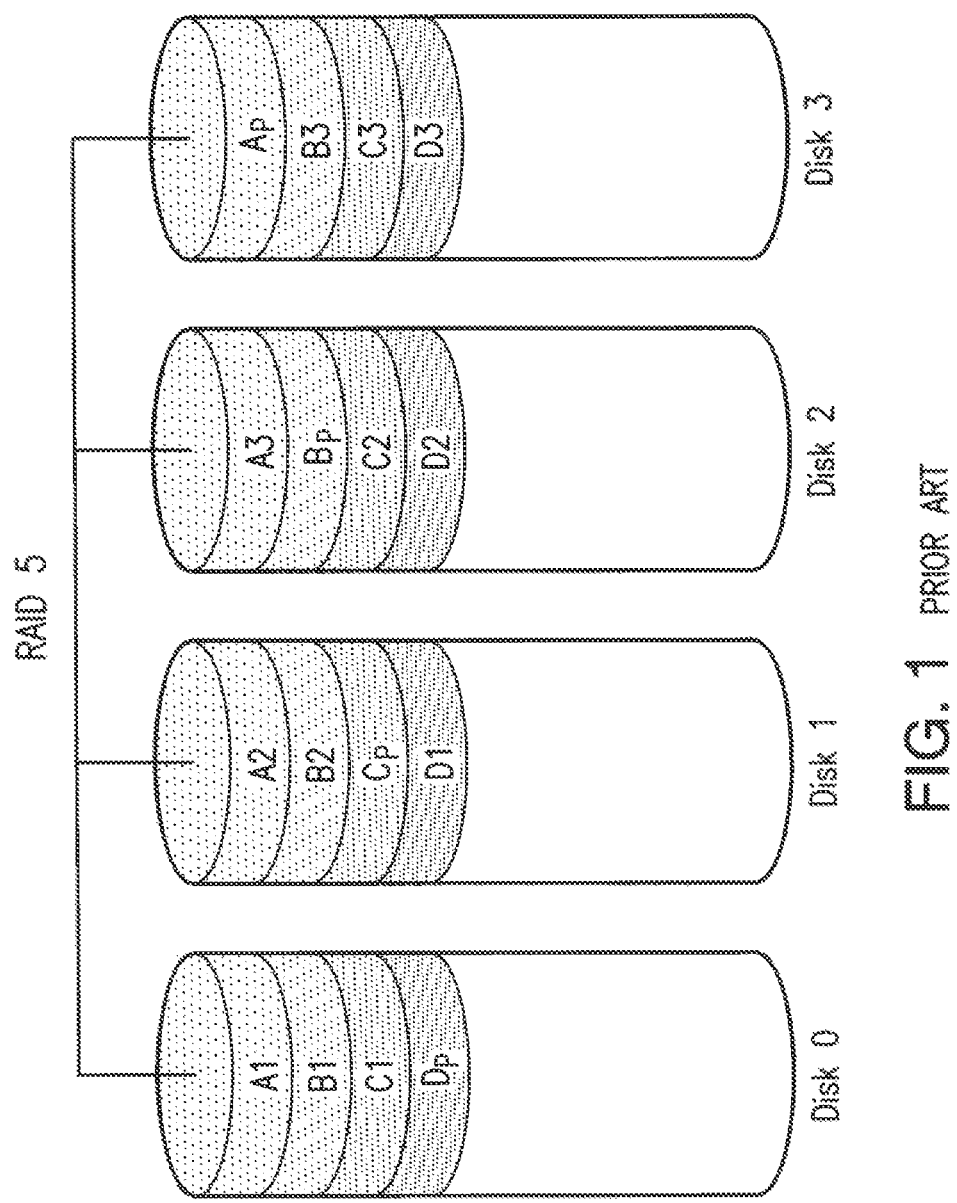
FIG. 1 is a schematic representation of RAID-5 data structure of the prior art.
Figure 2:
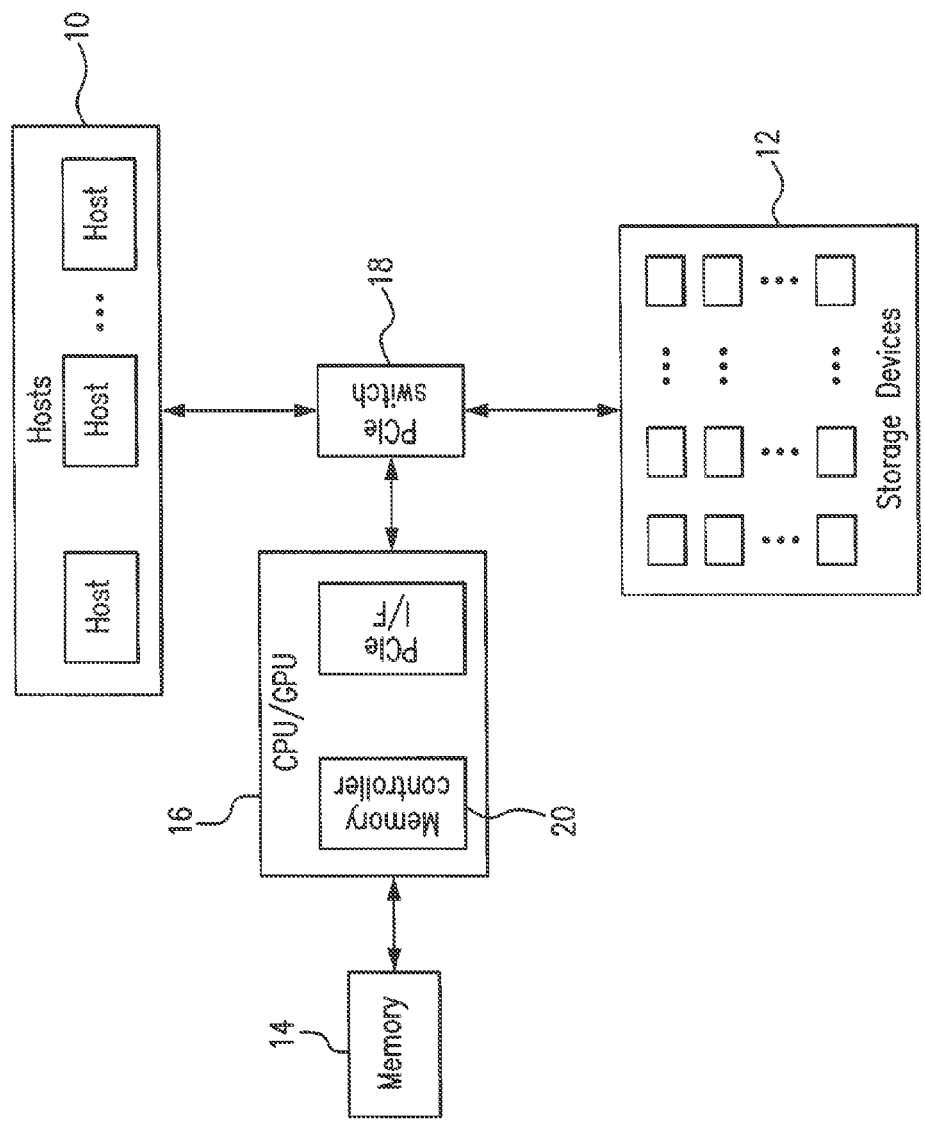
FIG. 2 is a schematic representation of the RAID engine performing XOR operations to generate parity in accordance with the prior art.
Figure 3:
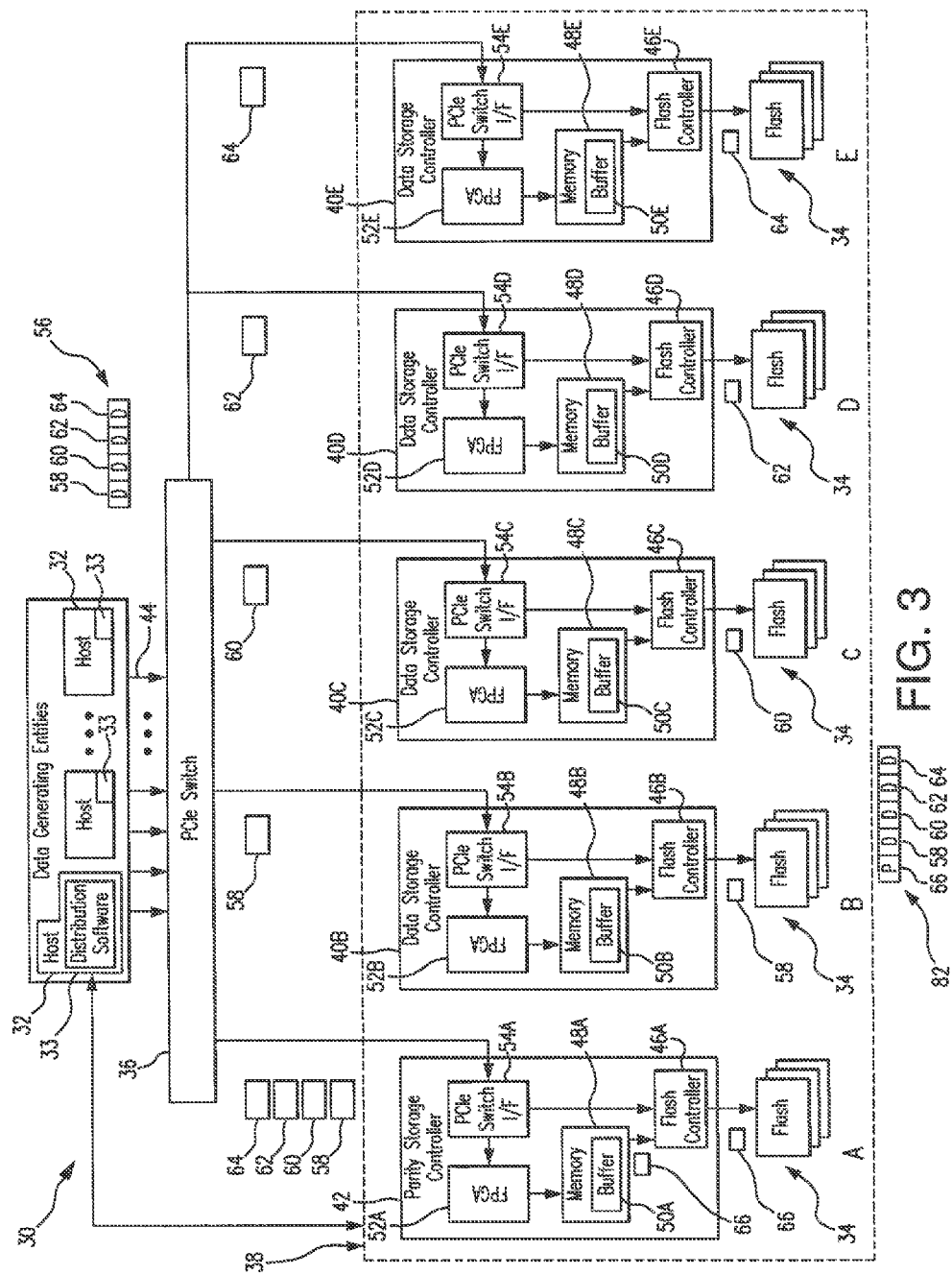
FIG. 3 is a schematic representation of the data storage system of the present invention using the flash controllers with embedded distributed XOR capability.

Referring to FIG. 3, the data storage system 30 of the present invention provides data storage for hosts (data generating entities) 32 in arrays of storage devices 34.

Computer clusters, groups of linked computers, as well as single computers, involved in extended computations, may be linked by a high-speed network that permits sharing of computer resources and memory. Data transfers to and from the computers may be performed through a high speed PCIe switch bus 36. Any computer within the computer clusters, as well as groups of linked computers may serve as hosts.

The storage devices 34 may be of different types, including traditional spinning disk drives, as well as solid-state storage devices, such as, for example, flash memory, phase-change memory, memristors, or other non-volatile storage units. As an example (and not to limit the scope of protection sought for in the present Patent Application), further description will be given for the flash type storage memory, although the principles of the present invention are also applicable to other types of storage devices.

The operation of computer clusters, as well as single computers, i.e. the hosts, requires data writing to and reading from the storage devices. The process of data transfers is carried out during the I/O cycle of the computers. The size of computer clusters and the aggregate I/O bandwidths that are to be supported may require thousands of data storage devices 34 for servicing the computing architecture.

During operation, a virtualized RAID unit engine applies RAID calculations to data ingress from a data generating entity prior to "writing" the data in the storage devices. As a part of the RAID calculations, parity values are calculated for the ingress data. The RAID unit allocates space in the data storage devices for the data (D) and the parity values (P).

The RAID unit may perform data reconstruction when "read" requests are serviced when corrupted or lost data is found. The parity values are used to reconstruct the data during the "read" operation.

In order to provide fast and simple generation of XOR parity data, the system 30 of the present invention merges the XOR capability of a RAID engine into the storage area network 38.

The storage area network 38 in the present system is implemented with a plurality of storage controllers, including data storage controllers, 40 (40B, 40C, 40D, and 40E), accompanied by a parity storage controller 42. The data storage controllers 40 and the parity flash controller 42 service a data channel 44. A plurality of data channels may exist between the data generating entities 32 and the data storage devices 34 for data migration therebetween. In each of the data channels used by a particular host 32 for data transfers, the host determines the distribution of the data. The host 32 is equipped with distribution software 33 for performing this task, i.e., the software 33 permits the host 32 to appoint one of the storage controllers in the storage area network 38 to perform parity calculations and "N" storage controllers to perform the role of the data storage controllers (as will be detailed in following paragraphs) in accordance with the size and type of the "write" (or "read") data request passing through the data channel.

The parity storage controller 42 and each data storage controller 40 (40B, 40C, 40D, and 40E) include a flash controller 46 (46A, 46B, 46C, 46D, and 46E, respectively) operatively coupled to a corresponding flash memory array 34 (A, B, C, D, and E, respectively), a memory 48 (48A, 48B, 48C, 48D, and 48E, respectively), a buffer 50 (50A, 50B, 50C, 50D, and 50E, respectively) within the memory 48, and an FPGA unit 52 (52A, 52B, 52C, 52D, and 52E, respectively). The parity storage controller 42 and each data storage controller 40 (40A, 40B, 40C, 40D, and 40E) also include a PCIe interface 54 (54A, 54B, 54C, 54D, and 54E, respectively) through which each storage controller 40, 42 is coupled to the PCIe switch 36 for fast data access.

The data storage controllers 40 and the parity storage controller 42, being substantially of identical design, are interchangeable, i.e., each has a capability of performing either function, i.e., the function of the data storage controller or the function of the parity storage controller. The specific function of the parity and data storage controllers, as well as the number of the data storage controllers 40 (40B, 40C, 40D, and 40E), is adaptively defined, as needed, for servicing a specific "write" and/or "read" data request.

A "write" data request may be represented by a data stripe 56, which may include "N" data blocks, for example data blocks 58, 60, 62 and 64. Any other number of data blocks is applicable herein. As will be detailed further, each of the data storage controllers 40 (40B, 40C, 40D, and 40E), and the parity storage controller 42, is designed with a logic engine to selectively XOR incoming data 56. For example, for the data distribution presented in FIG. 3, the storage controller 42 coupled to the flash memory array A is appointed as a parity storage controller. The data blocks of the incoming data stripe 56 are XOR-ed with previously received data block or with a result of the previous XOR operation, already recorded in the memory unit 48A of the parity storage controller 42.

The memory unit 48 (48A, 48B, 48C, 48D, and 48E) may be of any type, including, but not limited to DDR (Double Data Rate), Static Random Access Memory (SRAM), Flash memory, etc.

For example, being adapted for the DDR memory, the storage controllers 40, 42 may permit twice the data to be transferred without increasing the memory clock rate or increasing the bandwidth of the memory interface. When operating with the SRAM memory unit, the storage controllers 40, 42 may attain an improved SRAM bandwidth (due to the use of inverters for driving bit lines), higher speed of operations (due to the acceptance of all address bits at a time), and easily detectable small voltage swings (due to differential signaling permitted by the symmetric structure of SRAMS). When operating with the flash memory 48, the storage controllers 40, 42 may use less power and are significantly cheaper than with other types of memory.

As shown in FIG. 3, the host 32 sends, through the PCIe switch 36, a "write" data 56 (in the form of a data stripe segmented into various data blocks (58, 60, 62, and 64) based on the RAID protection scheme chosen to be written in the storage devices 34.

Usually, incoming data is striped, i.e., segmented logically in sequential data blocks in a way that access of sequential data blocks are made to different physical storage devices, for example, flash memory arrays B, C, D and E. The size of the incoming data 56 may differ from the one presented in FIG. 3 (which is given herein as an example only without limiting the scope of protection of the present invention).

The distribution of the storage controllers 40 (40B, 40C, 40D, and 40E) in the storage area network 38 corresponds to the size of the data stripe 56 and adds an extra storage controller (42) for the parity calculation function. In general, for servicing a data stripe having N data blocks, the system will provide N+1 storage controllers.

As shown in FIGS. 3 and 6A-6D, the storage controller 42 (coupled to the flash memory array A) receives (in sequence), the data blocks 58, 60, 62, and 64. The data storage controller 40B coupled to the flash memory array B receives the block 58 of the data. The data storage controller 40C (coupled to the flash memory array C) will receive a data block 60, while the data storage controller 40D coupled to the flash memory D receives the data block 62, and the data storage controller 40E coupled to the flash memory array E receives the data block 64 of the incoming "write" data 56.

Figure 6A:
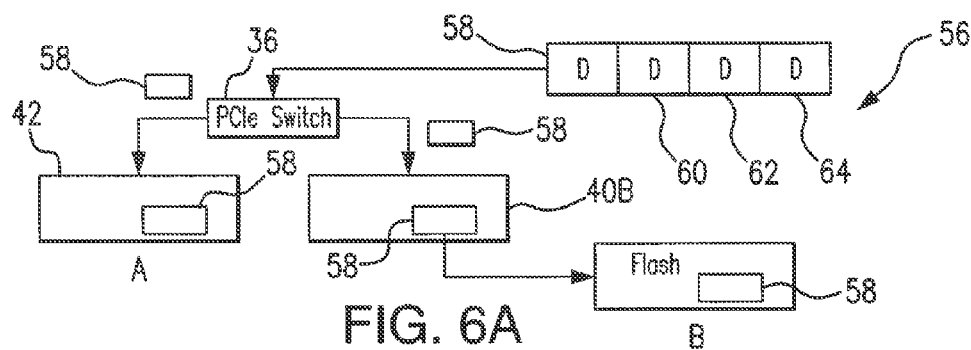
FIGS. 6A-6D represent schematically a sequence of operations performed for parity data generation in the present data storage system.

In operation, as shown in FIGS. 3 and 6A, the first data block 58 in the stripe 56 flows from the host 32 to the PCIe switch 36. Upon receipt of the block 58, the PCIe switch 36 forwards the data to the FPGA 52B to be stored in the memory 48B of the data storage controller 40B. The PCIe switch 36 mirrors the data block 58 to the FPGA unit 52A in the parity storage controller 42 to be saved in the memory 48A. The flash controller 46 on the data storage controller 40B corresponding to the flash memory array B reads the data from the memory 48B and writes it directly to the flash memory array B.

Figure 6B:
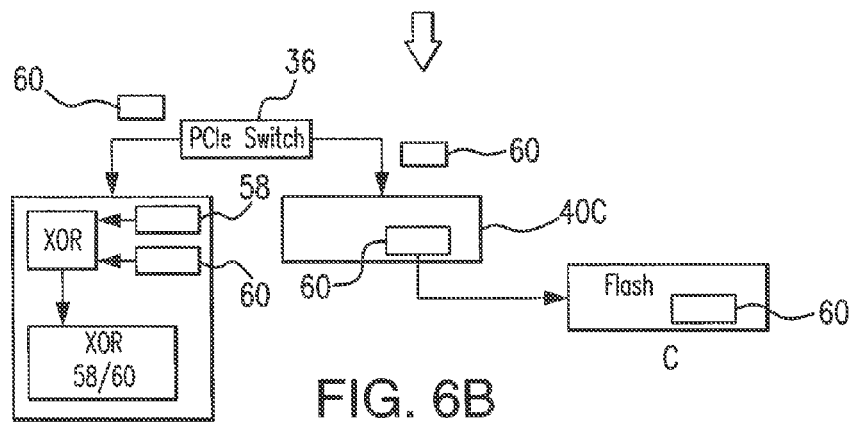

As further shown in FIGS. 3 and 6B, the sequential block of data 60 of the stripe 56 flows to the PCIe switch 36 and is forwarded to the FPGA unit 52C on the data storage controller 40C corresponding to the flash memory array C to be saved in the memory unit 48. This data block 60 is also mirrored by the PCIe switch 36 to the FPGA unit 52A on the parity storage controller 42 to be XOR-ed with the data block 58 already recorded. The generated intermediate $XOR_{58/60}$ is not transferred to the flash memory A, but is recorded into and is retained in the memory unit 48A of the appointed parity storage controller 42. The flash controller 46C on the data storage controller 40C corresponding to the flash memory array C reads the data block 60 in the memory 48C and writes it directly to the flash memory array C.

Figure 6C:
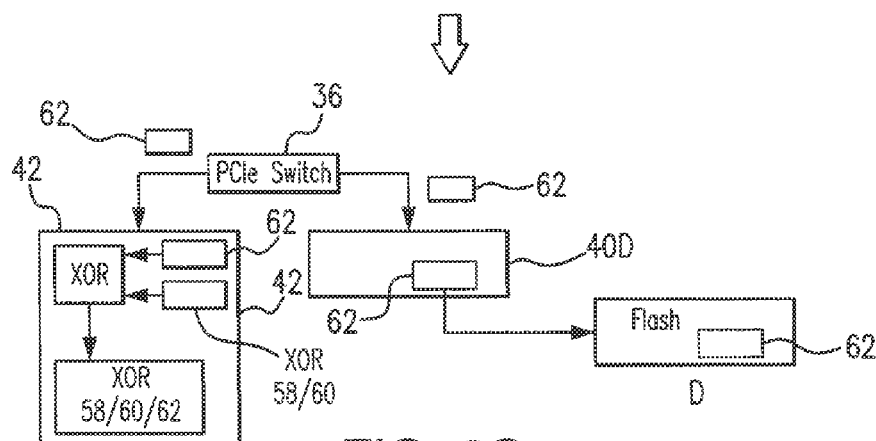

As further presented in FIGS. 3 and 6C, the next data block 62 in the stripe 56 flows to the PCIe switch 36 and is forwarded to the FPGA unit 52D on the data storage controller 40D (corresponding to the flash memory array D) to be saved in the memory unit 48D. The data block 62 is also mirrored by the PCIe switch 36 to the FPGA unit 52A at the parity storage controller 42 to be XOR-ed with the intermediate $XOR_{58/60}$ retained in the memory unit 48A of the appointed parity storage controller 42. The result of the intermediate XOR operation is retained in the memory 48A, i.e., the intermediate $XOR_{58/60/62}$ is not transferred to the Flash Memory A, but is written into the memory 48A in the parity storage controller 42. The flash controller 46D on the data storage controller 40D corresponding to the flash memory array D reads the data block 62 in its memory 48D and writes it directly to the flash memory array D.

Figure 6D:
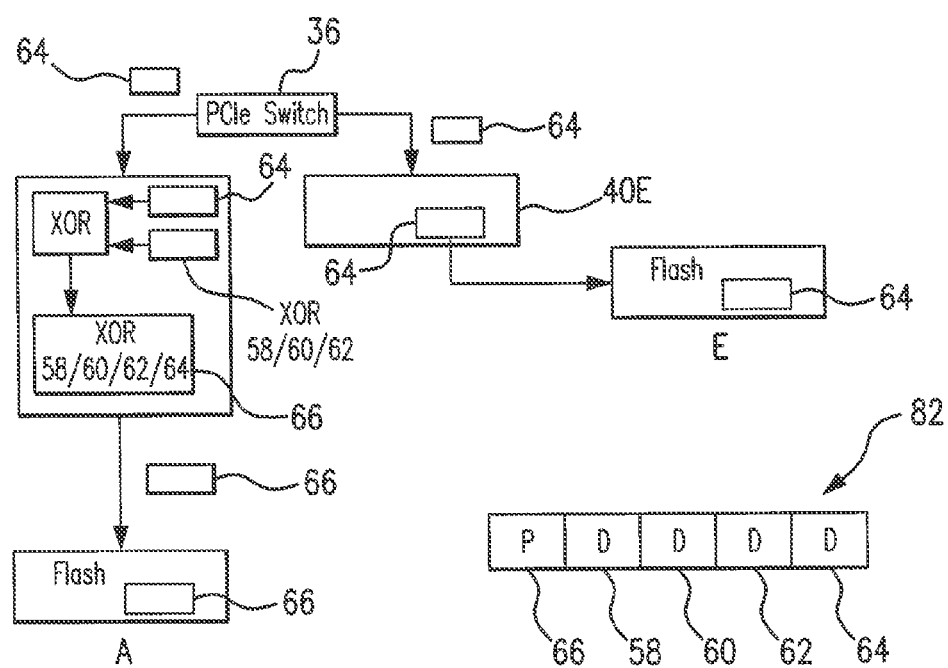

As presented in FIGS. 3 and 6D, the last data block 64 in the stripe 56 flows to the PCIe switch 36 and is forwarded to the FPGA unit 52E on the data storage controller 40E (corresponding to the flash memory array E) to be saved in the memory 48 E. The data block 64 is also mirrored by the PCIe 36 to the FPGA unit 52A on the parity storage controller 42 to be XOR-ed with the result $XOR_{58/60/62}$ of the previous XOR operation. The resulting $XOR_{58/60/62/64}$ is written into the memory 48A of the parity storage controller 42. The flash controller 46E on the data storage controller 40E (corresponding to the flash memory array E) reads the data block 64 in its memory 48E and writes it to the flash memory array E.

The resulting $XOR_{58/60/62/64}$ calculated in the parity storage controller 42 represents a final parity data 66 for the entire stripe 56 resulting from the XOR-ing of data blocks 58, 60, 62, and 64. The final parity data 66 for the entire stripe 56 is written into the memory 48A on the parity storage controller 42. The flash controller 46A of the parity storage controller 42 reads the parity stripe data 66 from the memory 48 and writes it to the flash memory array A.

The "write" request received from the host 32 is considered serviced when a resulting stripe 82 is stored in the flash memory arrays 34. The stripe 82 has a parity block 66, and data blocks 58, 60, 62, and 64, as shown in FIGS. 3 and 6D.

Figure 4:
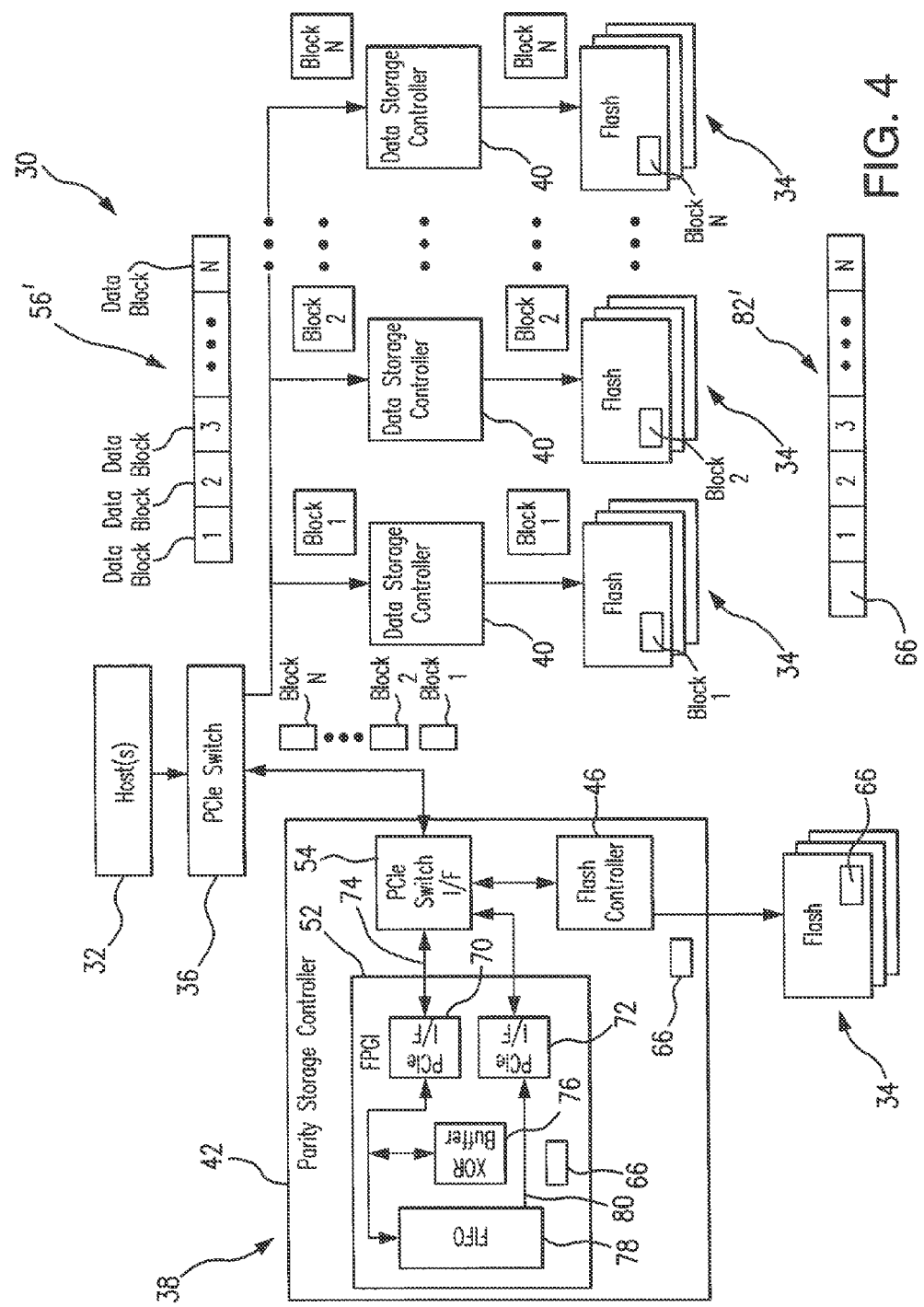
FIG. 4 is a more detailed schematic representation of the data storage system of the present invention.

FIG. 4 shows a more detailed schematic representation of the data and parity storage controllers 40, 42. Although details of only the parity storage controller 42 are presented, it is contemplated in the subject data storage system 30 that the data storage controllers 40 have the same hardware features as the parity storage controller 42 for full interchangeability when required. However, the parity and data storage controllers can be logically configured to perform different functions, i.e., parity generation (of parity storage controller 42) vs. passing the data directly to a corresponding flash array (for the data storage controllers 40).

As shown, the parity storage controller 42 is configured with the PCIe switch interface 54 for the receipt of the mirrored data blocks 1, 2, 3, . . . , N from the PCIe switch 36 through the channel 68. The PCIe interface 54 supplies the mirrored data blocks into the FPGA unit 52 in sequence. The FPGA unit 52 is preferably a dual PCIe ported FPGA, i.e. includes the PCIe interface 70 for data input and the PCIe interface 72 for XOR parity data output.

The data blocks 1, 2, 3, . . . , N received in sequence at the port 70 of the FPGA unit 52 through the communication channel 74 from the PCIe switch interface 54 further proceed to the XOR buffer 76 and the FIFO (First In First Out) unit 78. When the first data block (data block 1) in the stripe 56' is received at the FPGA unit 52, it is written in the FIFO unit 78. When a subsequent data block 2 (following the data block 1) is received at the PCIe port 70, it proceeds to the XOR buffer 76 where the data block 1 is "fetched" from the FIFO 78. The XOR logic function is applied to the data blocks 1 and 2, and the result ($XOR_{1/2}$) is transferred to the FIFO unit 78. This procedure is applied to all data blocks in the stripe 56 until the last data block "N" is processed and the parity is generated for the entire data stripe 56'.

When the parity data is calculated for the entire data stripe 56', the parity data 66 is transferred from the FIFO unit 78 to the PCIe interface 72 through the channel 80 and further is transferred through the PCIe switch interface 54 to the flash controller 46 to be written into the flash memory array 34. The resulting data written in the flash storage is presented as a data stripe 82' which contains the parity data block 66, and the data blocks 1, 2, 3, . . . , N, as shown in FIG. 4.

Referring back to FIGS. 3 and 4, the storage area network 38 is designed in a flexible adaptable manner, i.e., for different stripes of incoming data, the system (specifically, the host) dedicates one storage controller to function as a parity storage controller and holds the parity for the stripe which is being processed, and a plurality of data storage controllers, in accordance with the size of the stripe. The parity operation and the workload for calculating the parity is distributed across the storage area network 38 and does not occupy the CPU or the RAID engine.

With a plurality of data channels used for data transfers between hosts and data storage memory array, the system 30 provides for parallel data parity calculations across the host data channels where each storage controller (parity and data) is independent of all others. This structure enables linear scaling of data parity calculations, and provides a mechanism for parallel generation of multiple data protection schemes, including XOR-based parity schemes and N-way data replication.

By taking advantage of PCIe multicast and mirroring capabilities, the subject structure additionally minimizes the number of host-initiated I/O operations and reduces the number of memory copies.

A major use of this invention is in high-performance computing or supercomputing environments that require high-throughput data transfer rates and low-latency data protection mechanisms. For example, this device may be used to protect data stored in burst buffers or tiers of nonvolatile memories that are prone to failures. By using the subject structure in supercomputing environment, the hardware-based data protection solution will incrementally calculate data parity in parallel across each data channel. Since the scheme does not need the central controller or the RAID parity calculation engine to protect data, the subject approach eliminates the central control bottleneck and offloads parity calculations to the distributed data storage controllers.

As described in previous paragraphs, the parity storage controller 42 is responsible for computing the parity of a specific set of stripes. For example, the parity calculation may be distributed using a round-robin stripe distribution scheme (the striping is done by interleaving sequential data blocks on the flash memories in a round-robin fashion from the beginning of the data sequence) across the set of storage controllers. Since there is no longer a central controller responsible for computing the parity of each stripe, this distribution of the parity calculation task will unload the parity generation from the CPU.

Furthermore, the host data channels may be actively used in parallel. The hosts can issue parallel write requests to the storage controllers that will be buffered by the PCIe switch 36. The data channel chosen to be the parity channel would rotate similar to a traditional RAID 5 implementation.

In addition, the parity calculation capability of the subject structure can be disabled to provide the N-way data block replication. In this mode, the parity storage controller becomes a redundant data controller that would buffer additional copies of the data blocks of the "write" data stripe. This mode takes advantage of the PCIe switch's multicast capability to reduce the total number of host initiated I/O requests. The N-way data block replication is supported by the controller's memory 48 ability to buffer replicated data blocks. The storage throughput and latency is improved due to the fact that the XOR engine is bypassed, but additional flash storage is required to hold the N−1 data blocks of replicated data.

In the present system, the host's "read" operations are not buffered through a centralized RAID engine or processor. Host "reads" may be sent directly to the flash memories 34. Hosts may also request data for a missing member in a stripe to be reconstructed by reversing the "write" operation and mirroring the read data to the buffer 50 in a designated storage controller 40 or 42. Once the "read" operations for the stripe of data are completed and mirrored to the buffer 50, the missing data can be read directly from the buffer 50.

Figure 5:
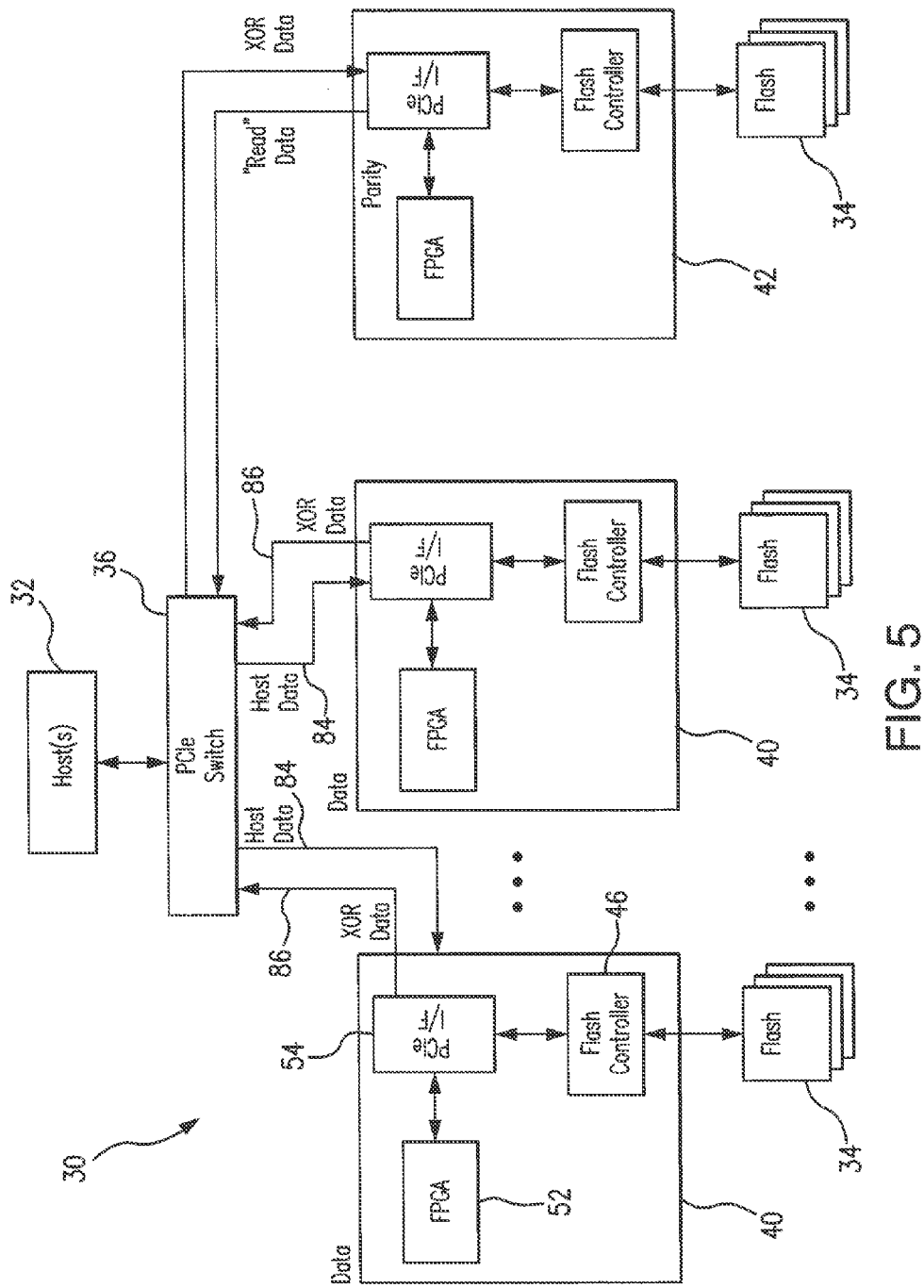
FIG. 5 is a schematic representation of the alternative embodiment of the data storage system of the present invention adapted for servicing "write" and "read" requests.

Referring to FIG. 5, when data reconstruction is needed, the parity data would be read from the channel. For this purpose, each data storage controller 40 is connected to the PCIe switch 36 through two channels, i.e., the channel 84 for passing the host data and the channel 86 for reading XOR data from the buffer 50 when the data reconstruction is needed. For the XOR channel, i.e., the channel containing the storage controller 42 dedicated for parity generation, these channels 84, 86 reverse, i.e., XOR data passes from the PCIe switch 36 to the storage controller 42, and the "read" data passes to the PCIe switch 36.

In the present system, adaptive data protection may be achieved in case of missing or failed members. After a missing or a failed member has been detected, new data that needs to be written will continue to be protected with reduced number of data members. This means that if there were N data members (data blocks) and a parity member before the failure, the new data that needs to be written will use (N−1) data members, and a parity member, thus continuing to run with data protection until the failed member is replaced.

Assuming that the storage devices 34 associated with the subject data storage system are configured as an end storage, i.e. not transitional, existing data sets could be recovered and may be written back to storage using the adaptive data protection mechanism with the reduced data members. For transitional storage, however, this would not be required as the data would eventually be transferred to an end storage and can be invalidated in the transitional storage.

The structure of the present invention permits the RAID capability to be easily scaled out by adding additional flash storage controllers to the PCIe switch 36. An advantage of this system lies in that the data passes through the storage network to the data storage devices without being buffered. Read operations may be performed directly to the data storage device to bypass the parity engine.

Figure 7:
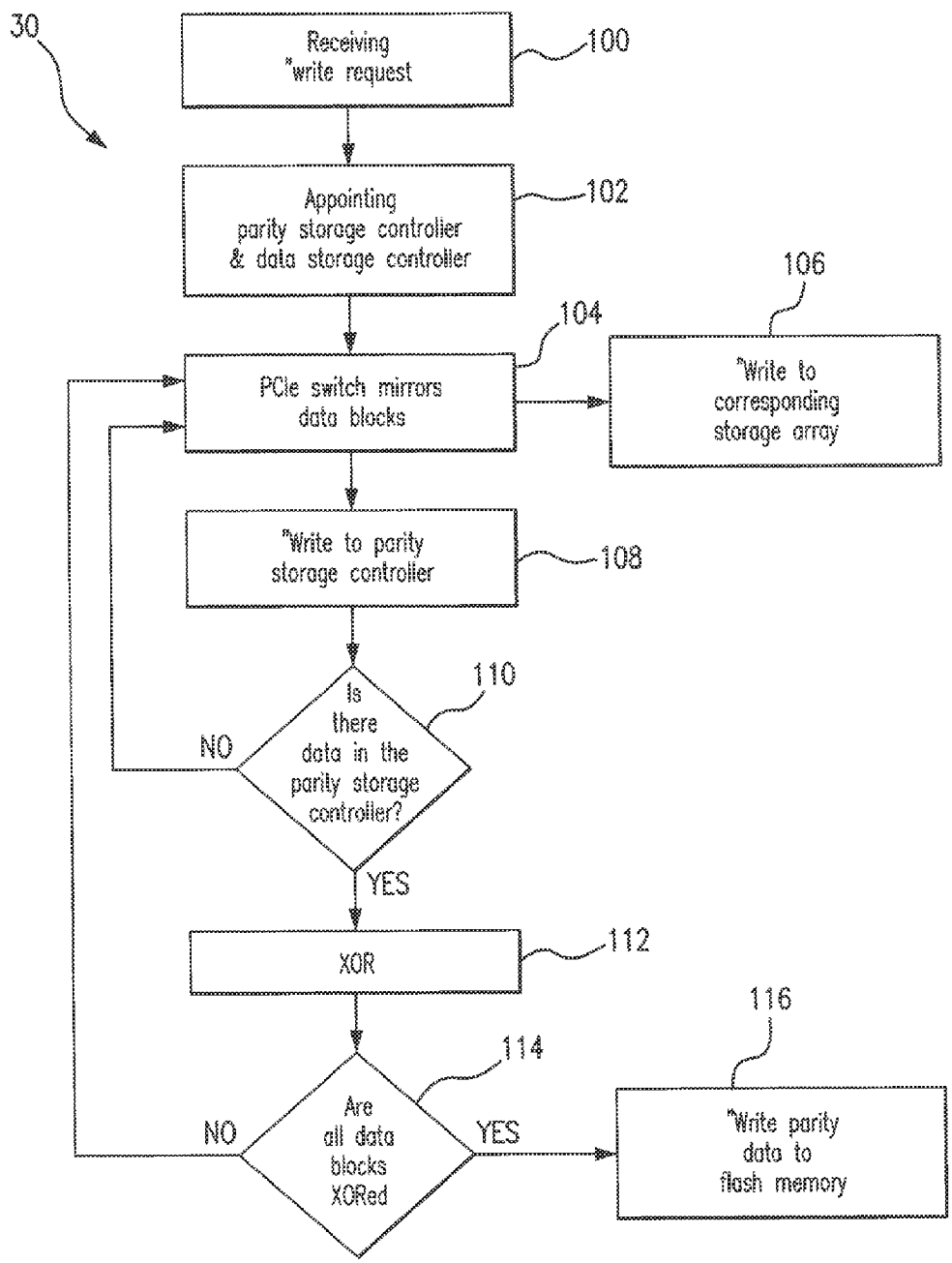
FIG. 7 is a flow chart diagram representing the method for data migration and processing of the present invention.

Referring to a flow chart diagram of the process supported by the structure 30 of the present invention, as shown in FIG. 7, data migration (including the flow mechanism of the data blocks, creation of parity, and writing of the data and parity to the storage) is initiated in step 100 with receiving a "write" request from a host. At this point, responsive to the receipt of the write data, the logic flows to step 102, where the host appoints a parity storage controller and a number of data storage controllers corresponding to the size of the data stripe. When the parity storage controller and a plurality N of the data storage controllers are appointed, the logic flows to step 104 where the PCIe switch mirrors the data block which is transferred to a corresponding data storage controller.

In step 106, the "write" data block is forwarded to the corresponding storage array. Also, the data block is written to the parity storage controller in block 108. When the data block is written to the parity storage controller, the logic checks in step 110 if there is another data residing in the memory of the parity storage controller. If the memory in the parity storage controller has other data, the logic performs the step 112 by applying the XOR calculation to the data newly received thereat and the data already residing there. If, however, the data written into the parity storage controller is the first received thereat, the logic loops to step 104.

Upon completion of the XOR operation performed in step 112, the process flows to the decision block 114 where the decision is made whether all data blocks in the data stripe are processed, i.e., the parity storage controller 42 checks if all "N" blocks of the stripe 56 have been written into the buffer 50 in the memory 48 of the parity storage controller 42, and XOR-ed. If the entire data stripe 56 has been processed, then the procedure has been completed. The parity for the entire stripe has been calculated, and the PCIe transaction is considered complete prior to committing the parity data for the entire stripe to the flash memory in step 116. When the entire stripe (all "N" data blocks of the data stripe 56) has been processed, and XOR operation for the entire stripe has been completed, the host sends a request to the flash memory to read the parity XOR data 66 from the buffer 50 of the memory 48 of the parity storage controller 42, as shown in FIGS. 3, 4 and 6D.

If, however, there are unprocessed blocks still remaining in step 114, the logic loops to step 104.

By connection of the storage area network 38 capable of XOR operation with the PCIe switch 36, the host port bandwidth is N, where N is a stripe size, and XOR port bandwidth attained is N+P, where N is a stripe size, and P is a parity/block size, and the storage port bandwidth is P, where P is a parity/block size. This embodiment provides for tight integration with the PCIe switch, and satisfactorily operates with any type of PCIe storage device that can DMA (Direct Memory Access) the data.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is being claimed is:

1. A method for generating a parity data in a data storage system, comprising:
   (a) arranging a plurality of storage controllers into a storage area network;
   (b) coupling a corresponding data storage device to each of said plurality of storage controllers;
   (c) embedding an XOR (Exclusive OR) logic function unit in each of said plurality of storage controllers;
   (d) upon receiving a "write" data request from at least one host, wherein said "write" data request has a number N of sequential data blocks, appointing in said plurality of storage controllers, a parity storage controller and N data storage controllers adaptively to said number N of sequential data blocks in said "write" request;
   (e) directly writing a first of said N data blocks incoming from said "write" data request into said appointed parity storage controller;
   (f) directly writing a second of said N data blocks incoming from said "write" data request into said appointed parity storage controller;
   (g) automatically applying, under control of said appointed parity storage controller, the XOR logic function to said first and second data blocks incoming directly into said appointed parity storage controller from said "write" data request, thereby generating an intermediate XOR result for said first and second data blocks, and retaining said intermediate XOR result in said appointed parity storage controller;
   (h) writing directly into said appointed parity storage controller remaining N-2 data blocks incoming in sequence from said "write" data request, and for each data block incoming from said "write" data request subsequent to said second data block, automatically applying, under control of said appointed parity storage controller, said XOR logic function to said each subsequent data block and a respective intermediate XOR result of a previous XOR computation retained in said appointed parity storage controller;
   (i) repeating said step (h) until said XOR logic function has been applied to said N data blocks incoming from said "write" data request, resulting in generation of a final parity data for an entire said "write" data request; and
   (j) writing said final parity data for said entire "write" data request from said appointed parity storage controller into said data storage device coupled to said appointed parity storage controller.

2. The method of claim 1, further comprising:
in said steps (e), (f), and (h), writing said first, second, and each of the remaining N-2 blocks, respectively, into a respective data storage devices coupled to a first, second, and each of the remaining N-2 data storage controllers, respectively.

3. The method of claim 1, wherein said storage system is a RAID (Redundant Array of Independent Drivers) system.

4. The method of claim 1, wherein said "write" data request is represented as a data stripe including N data blocks.

5. The method of claim 1, further comprising:
receiving another "write" data request, and
adapting said appointment of said appointed parity storage controller and said data storage controllers distribution in said step (d) in accordance with another "write" data request.

6. The method of claim 1, further comprising:
integrating each of said storage controllers with a FPGA (Field-Programmable Gate Array), and
performing said XOR logic function in said FPGA of said appointed parity storage controller.

7. The method of claim 1, further comprising:
coupling PCIe switch between said at least one host and said plurality of storage controllers; and
upon receipt of said "write" data request at said PCIe switch, transmitting in said steps (e) and (f), said "write" data request to said data storage devices and mirroring the same to said appointed parity storage controller.

8. The method of claim 7, wherein said at least one host sends a plurality of said "write" data requests to said PCIe switch over a plurality of data channels, said method further calculating said parity data in parallel across said plurality of data channels.

9. The method of claim 1, wherein said appointed parity storage controller is a redundant data controller, further comprising:
buffering additional copies of each of said data blocks in said appointed parity storage controller; and
replicating said buffered data blocks if needed.

10. The method of claim 1, further comprising:
receiving a "read" request from said at least one host, and
after said step (j), transferring said data requested from a corresponding data storage device into said appointed parity storage controller, and subsequently to said at least one host.

11. The method of claim 10, further comprising:
detecting a corresponded data block in said read data; and
reconstructing said corrupted data block by reversing said writing operation in said steps (e), (f), (h), and (j).

12. A data storage system, comprising:
a storage area network including a plurality of storage controllers adaptively coupled each to the other, wherein each of said storage controllers includes:
an XOR logic function unit embedded in said each storage controller,
a buffer coupled to said XOR logic function unit, and
a flash controller coupled to said buffer,
wherein each of said storage controllers is operatively coupled, by an input thereof, to at least one host, said host generating a "write' request having a number N of sequential data blocks; and
a plurality of data storage devices, each coupled to a respective one of said storage controllers;
wherein said at least one host is operatively coupled to said storage area network and is configured to appoint a parity storage controller and N data storage controllers from said plurality of storage controllers adaptively to said number N of sequential data blocks in said "write" request to service said "write" data request, wherein said appointed parity storage controller is configured to perform parity storage controller function for a data stripe of said "write" data request, and said appointed N data storage controllers are configured to perform data storage controllers function in accordance with said data stripe of said "write" data request;

wherein said appointed parity storage controller is configured to automatically apply said XOR logic function incrementally to said N data blocks of said data stripe incoming in sequence from said "write" data request directly into said appointed parity storage controller and respective intermediate XOR results of preceding XOR computations retained in said appointed parity storage controller until a final parity data for an entire said "write" data request has been generated, and to write said final parity data for said entire "write" data request from said appointed parity storage controller to said respective data storage device coupled thereto.

13. The system of claim 12, wherein each of said data storage controllers is configured to transfer a respective one of said data blocks of said "write" data request to one of said data storage devices coupled thereto.

14. The system of claim 12, wherein said appointed parity storage controller is integrated with a FPGA (Field-Programmable Gate Array) for performing said XOR logic function.

15. The system of claim 14, wherein said FPGA includes a first port for sequential receipt of said data blocks, said buffer being coupled to said first port,
- an FIFO (first-in-first-out) unit coupled to said first port and said buffer for receiving and releasing said data blocks, and said respective intermediate XOR results of preceding XOR computations; and
- a second port coupled between said FIFO unit and said flash controller to fetch said parity data of said "write" data request to said respective data storage device.

16. The system of claim 12, further including a PCIe switch coupled between said at least one host and said storage area network, wherein said PCIe switch is configured, upon receipt of said "write" data request, to mirror and multicast said "write" data to said parity storage controller and to a respective data storage devices.

17. The system of claim 12, wherein said data storage system is a RAID (Redundant Array of Independent Drives) system.

18. The system of claim 12, wherein said data storage devices include flash memory arrays.

\* \* \* \* \*